No. 709,150. Patented Sept. 16, 1902.
J. T. HALLS.
EXTENSIBLE PAN.
(Application filed Jan. 16, 1902.)
(No Model.) 2 Sheets—Sheet 1.

Witnesses Inventor
J. T. Halls,
By
Attorneys

No. 709,150. Patented Sept. 16, 1902.
J. T. HALLS.
EXTENSIBLE PAN.
(Application filed Jan. 16, 1902.)
(No Model.) 2 Sheets—Sheet 2.
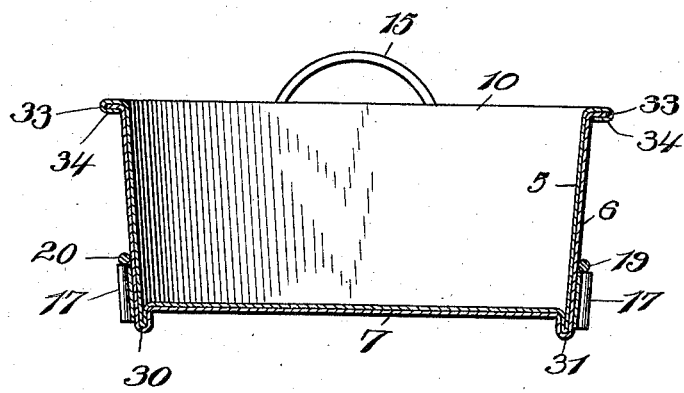
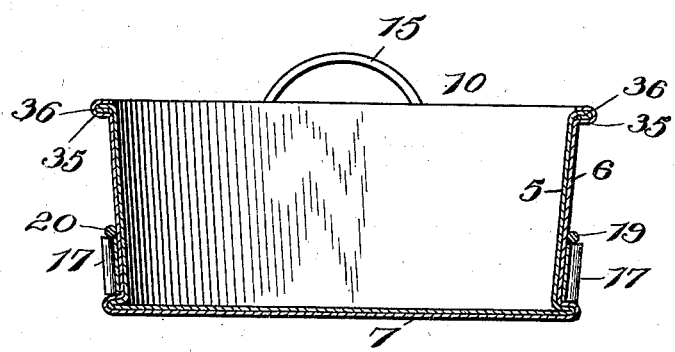
Witnesses
Inventor
J. T. Halls

UNITED STATES PATENT OFFICE.

JOHN T. HALLS, OF DUMFRIES, VIRGINIA.

EXTENSIBLE PAN.

SPECIFICATION forming part of Letters Patent No. 709,150, dated September 16, 1902.

Application filed January 16, 1902. Serial No. 89,996. (No model.)

*To all whom it may concern:*

Be it known that I, JOHN T. HALLS, a citizen of the United States, residing at Dumfries, in the county of Prince William, State of Virginia, have invented certain new and useful Improvements in Extensible Pans; and I do hereby declare the following to be a full, clear, and exact description of the invention, such as will enable others skilled in the art to which it appertains to make and use the same.

This invention relates to bread-pans, although the principles involved may be embodied in pans for other specific purposes; and it has for its object to provide a pan including telescopically-connected sections which may be drawn out or pushed in to vary the dimensions of the pan, a further object of the invention being to provide a simple, cheap, and efficient means for holding the members of the pan in their different adjusted positions.

Figure 1:
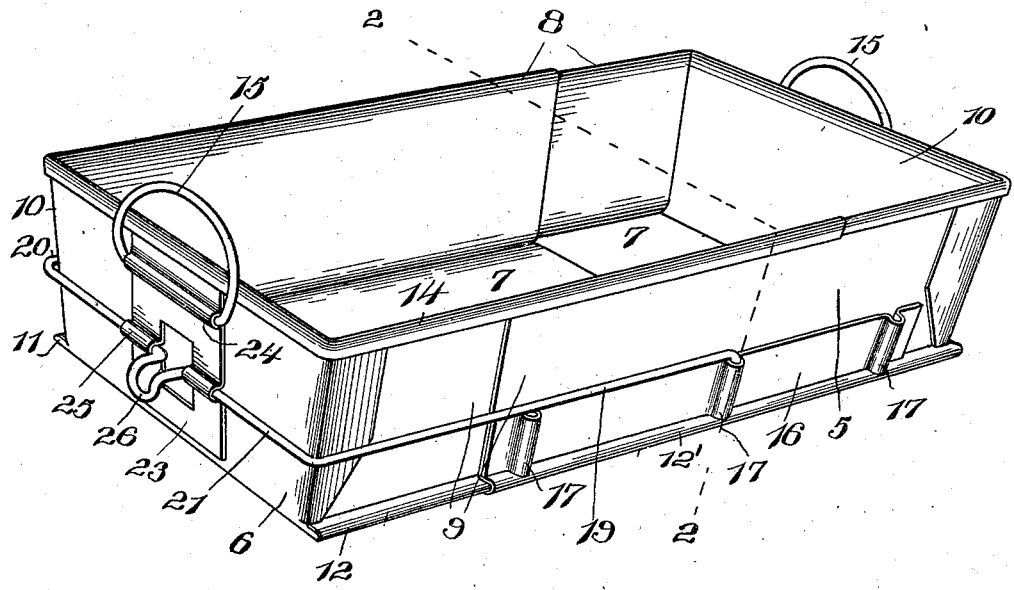
Figure 2:
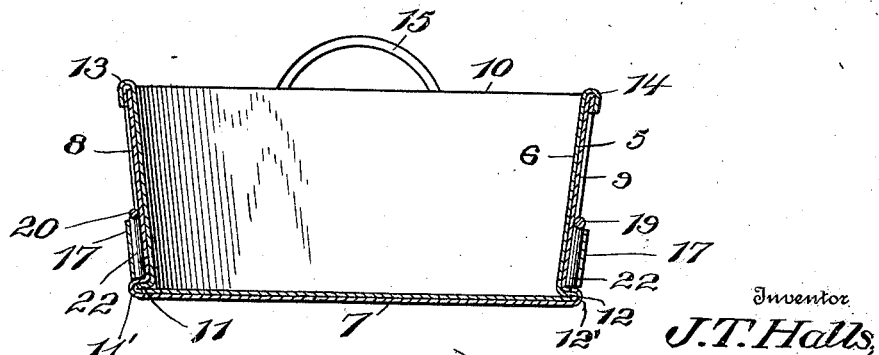

In the drawings forming a portion of this specification and in which like numerals of reference indicate similar parts in the several views, Figure 1 is a perspective view showing a pan embodying the present invention. Fig. 2 is a transverse section through the pan on line 2 2 of Fig. 1 and including the engaging ends of the latch. Fig. 3 is a transverse section in the same plane as Fig. 2 and showing a modified form of pan. Fig. 4 is a section similar to Fig. 3 in the same plane and showing a third specific construction of pan. Fig. 5 is a perspective view of the latch.

Referring now to the drawings, there is shown a pan including two end members 5 and 6, each of which includes a bottom 7, from which are bent up the sides 8 and 9, and an outer end 10, the side edges of the end being lapped upon the sides and secured in any desired manner. The sections are each of sheet metal, and the metal at the bottom side edges of each member is bent outwardly and then inwardly to form the horizontally-projecting side bottom flanges 11 and 12 on the member 6 and the corresponding flanges 11' and 12' on the member 5. The upper and lower layers of metal forming the flanges 11 and 12 of the member 6 lie in close contact, while the corresponding layers of the flanges 11' and 12' of member 5 are spaced apart sufficiently to receive the flanges of the member 6 between them, the dimensions of the member 5 being sufficiently greater transversely to permit of the member 6 sliding into the member 5. The upper edges of the member 5 are headed over, as are also the upper edges of the member 6, the side beads 13 and 14 of the latter being open to receive the upper edges of the former to make a sliding connection. Against the outer faces of the ends of the members 5 and 6 are attached handles, which may be in the form of rings 15 and which facilitate the operation of adjusting the parts or members of the pan. To hold the members 5 and 6 of the pan in their different adjusted positions, a strip of metal 16 is secured against the outer face of each side of the member 5, and in each of these strips is formed a series of outwardly-directed loops 17, forming latch-receiving sockets. In connection with the loops or sockets there is employed a U-shaped latch-lever 18, comprising the spaced members 19 and 20 and the connecting web 21, the web being adapted to lie close against the end of the member 6, while the free ends of the members are bent downwardly to form hooks 22 for engagement with the loops of the member 5 when the members are properly adjusted to permit of such engagement.

The web 21 is held pivotally against the end of the member 6 by the metal plate 23, bent to form the loops 24 and 25, the loop 24 receiving the ring-handle at that end of the pan, while the loop 25 receives the web of the latch. The central portion of the web of the latch is bent outwardly and downwardly to form a handle 26, the central portion of the loop 25 being cut away to permit of projection of the handle, as shown. By manipulation of the handle the free ends of the members of the latch are raised and lowered to disengage and engage the loops or sockets. When the hooks are raised from the sockets, the members 5 and 6 may be correlatively adjusted, after which the hooks may be lowered into engagement with the loops to hold the members against further movement.

In Fig. 3 of the drawings there is shown a construction wherein the base-flanges 30 and 31 of the members 5 and 6 are vertical instead of horizontal to form longitudinal supporting-ribs, while at the upper edge of the member 6 is an outwardly-directed flange 33, over and under which is bent the flange 34.

In Fig. 4 of the drawings the inner member 5 has the straight outwardly-directed flange at its upper edge, the member 6 having its upper flanges 35 bent outwardly under and then upwardly and over the flanges 36 of the member 5.

In practice modifications other than those shown may be made, and any suitable materials and proportions may be used for the various parts without departing from the spirit of the invention.

What is claimed is—

1. An extensible pan comprising members telescopically connected, a latch carried by one of the members, and a plurality of sockets carried by the other member for engagement interchangeably by the latch to hold the members at different points of their telescopic adjustment.

2. An extension bread-pan comprising members telescopically connected, one of said members having sockets at its sides, and a U-shaped latch pivoted to the other member and having its ends bent downwardly to engage the sockets interchangeably.

3. An extensible pan comprising members telescopically connected, one of said members having sockets at its sides, and a U-shaped latch having its ends bent downwardly to engage the sockets interchangeably, said latch having its web portion pivotally connected to the second member and having the central portion of the web bent outwardly to form a handle for manipulating the latch.

4. An extensible pan comprising separate members each having base and upper edge flanges, the flanges of one member being slidably engaged with the flanges of the other member, a plurality of sockets at each side of one member, and a U-shaped latch having its web pivotally connected with the other member and having its ends bent to form hooks for engagement with the sockets of the other member, the web of the latch being bent outwardly to form a handle for manipulating the latch.

In testimony whereof I affix my signature in presence of two witnesses.

JOHN T. HALLS.

Witnesses:
  J. H. GARRISON,
  GEO. R. BRAWNER.